United States Patent
Ha et al.

(10) Patent No.: US 10,999,000 B2
(45) Date of Patent: May 4, 2021

(54) APPARATUS AND METHOD FOR SECURE COMMUNICATION USING ARTIFICIAL NOISE SCHEME

(71) Applicant: Korea Advanced Institute of Science and Technology, Daejeon (KR)

(72) Inventors: Jeongseok Ha, Daejeon (KR); Sangseok Yun, Daejeon (KR); Sanghun Im, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 277 days.

(21) Appl. No.: 16/162,014

(22) Filed: Oct. 16, 2018

(65) Prior Publication Data
US 2019/0229833 A1    Jul. 25, 2019

(30) Foreign Application Priority Data

Jan. 24, 2018 (KR) .................. 10-2018-0008545
Apr. 10, 2018 (KR) .................. 10-2018-0041423

(51) Int. Cl.
| | |
|---|---|
| H04W 52/26 | (2009.01) |
| H04W 52/24 | (2009.01) |
| H04K 3/00 | (2006.01) |
| H04K 1/02 | (2006.01) |
| H04W 52/20 | (2009.01) |
| H04W 52/16 | (2009.01) |
| H04W 52/42 | (2009.01) |

(52) U.S. Cl.
CPC ............ *H04K 1/02* (2013.01); *H04W 52/16* (2013.01); *H04W 52/20* (2013.01); *H04W 52/241* (2013.01); *H04W 52/267* (2013.01); *H04W 52/42* (2013.01)

(58) Field of Classification Search
None
See application file for complete search history.

(56) References Cited

U.S. PATENT DOCUMENTS

| | | | |
|---|---|---|---|
| 10,069,592 B1 * | 9/2018 | Krunz ................ | H04K 3/94 |
| 2013/0309975 A1 * | 11/2013 | Kpodzo .............. | H04B 1/1027 455/63.1 |

OTHER PUBLICATIONS

"Yulong Zou, Improving Physical-layer Security in Wireless Communications Using Diversity Techniques, Jan. 2015, IEEE Network, vol. 29, Issue: 1, pp. 42-48" (Year: 2015).*

(Continued)

*Primary Examiner* — Joseph P Hirl
*Assistant Examiner* — Hassan Saadoun
(74) *Attorney, Agent, or Firm* — Leber IP Law; Sarah M. Gates (57) ABSTRACT

Disclosed are a secure communication device and a secure communication method using an artificial noise scheme. The secure communication method between a multi-antenna legal transmission device and a multi-antenna legal reception device includes determining a power allocation ratio for a system parameter, by the legal reception device, generating a transmission signal including a secret information message based on the determined power allocation ratio and artificial noise, and transmitting the generated transmission signal to the legal reception device.

16 Claims, 7 Drawing Sheets

(56) References Cited

OTHER PUBLICATIONS

"Xiangyun Zhou, Secure Transmission with Artificial Noise over Fading Channels: Achievable Rate and Optimal Power Allocation, Jul. 2010, IEEE Network, vol. 59, Issue: 8, pp. 3831-3842" (Year: 2010).*

Wei Li, Secure Communication via Sending Artificial Noise by the Receiver: Outage Secrecy Capacity/Region Analysis, Oct. 2012, IEEE, vol. 16, pp. 1628-1631. (Year: 2012).*

S. Yun, S. Im, I. Kim and J. Ha, "On the Secrecy Rate and Optimal Power Allocation for Artificial Noise Assisted MIMOME Channels," in IEEE Transactions on Vehicular Technology, vol. PP, No. 99, 16 pgs., Nov. 22, 2017.

* cited by examiner

APPARATUS AND METHOD FOR SECURE COMMUNICATION USING ARTIFICIAL NOISE SCHEME

CROSS-REFERENCE TO RELATED APPLICATIONS

A claim for priority under 35 U.S.C. § 119 is made to Korean Patent Application Nos. 10-2018-0008545 filed on Jan. 24, 2018 and 10-2018-0041423 filed on Apr. 10, 2018, in the Korean Intellectual Property Office, the entire contents of which are hereby incorporated by reference.

BACKGROUND

Embodiments of the inventive concept described herein relate to a secure communication technology using an artificial noise scheme and more particularly, to an apparatus and a method for secure communication, by which secure transmission rate may be improved by transmitting an artificial noise signal together with a secret information message in a multi-antenna environment.

Wireless communication is vulnerable to security threats such as eavesdropping because it is performed through wireless channels that are innately vulnerable to security. In order to solve the problem, two security schemes largely have been suggested. The first scheme is a cryptology based security technology, and the second scheme is a physical layer security technology.

In the traditional cryptology based security technology, a transmitter encrypts a secret information message by using a security key and transmits the encrypted secret information message. Then, in order to decode the encrypted secret information message, a receiver has to carry the security key of the transmitter or a security key corresponding to the security key of the transmitter. In order to utilize an existing cryptology based security technology in this way, a security key has to be shared in advance through a reliable institute. In addition, because the cryptology based security technology provides a security that depends on calculation complexity, it is expected to reach a limit in the near future as the semiconductor and signal processing technologies develop. In particular, if proton computers that are expected to remarkably improve the calculation ability of processors are commercialized, it is expected that most of the cryptology based security technologies will be incapacitated.

Meanwhile, the physical layer security technology interrupts a trial of eavesdropping of an eavesdropper by using the physical features of various physical layer resources, such as wireless channels and thermal noise. In the physical layer security technology, a security key does not need to be shared in advance as in the existing cryptology based security technology and secure communication may be performed regardless of the calculation ability of the eavesdropper.

The artificial noise generating scheme that is one of the representative physical layer security technologies is a technology of selectively deteriorating only a received signal to noise ratio of an eavesdropper when a secret information message is transmitted by using the features of the wireless channels and the multi-antenna based beam forming scheme.

SUMMARY

Embodiments of the inventive concept provide an apparatus and a method for secure communication, by which secure transmission rate may be improved by transmitting an artificial noise signal together with a secret information message in a multi-antenna environment.

Embodiments of the inventive concept also provide an optimum power allocation scheme that may maximize ergodic secure transmission rate based on a power allocation ratio of a secret information message and artificial noise.

In accordance with an aspect of the inventive concept, there is provided a secure communication method between a multi-antenna legal transmission device and a multi-antenna legal reception device including determining a power allocation ratio for a system parameter, by the legal reception device, generating a transmission signal including a secret information message based on the determined power allocation ratio and artificial noise, and transmitting the generated transmission signal to the legal reception device.

The determining of the power allocation ratio may include acquiring a lower bound of an ergodic secure transmission rate acquired by using the artificial noise in a form of a closed solution, and determining an optimum power allocation ratio for the system parameter by using the acquired lower bound of the ergodic secure transmission rate.

The determining of the power allocation ratio may include determining an optimum power allocation ratio of the secret information message and the artificial noise, by which the ergodic secure transmission rate is maximized, by using the acquired lower bound of the ergodic secure transmission rate.

The determining of the power allocation ratio may include acquiring a lower bound of the ergodic secure transmission rate that is attainable by using the artificial noise by acquiring a lower bound of the ergodic transmission rate that is attainable by the legal reception device and an upper bound of the ergodic transmission rate that is attainable by an eavesdropper.

The determining of the power allocation ratio may include determining an optimum power allocation ratio corresponding to the system parameter including the number of antennas, total available transmission power, and a channel estimation error coefficient.

In accordance with another aspect of the inventive concept, there is provided a secure communication method between a multi-antenna legal transmission device and a multi-antenna legal reception device including acquiring a lower bound of an ergodic secure transmission rate that is attainable by using artificial noise in a form of a closed solution, determining an optimum power allocation ratio for a system parameter by using the acquired lower bound of the ergodic secure transmission rate, by the legal transmission device, generating a transmission signal including a secret information message based on the determined optimum power allocation ratio and the artificial noise, and transmitting the generated transmission signal to the legal reception device.

The determining of the power allocation ratio may include determining an optimum power allocation ratio of the secret information message and the artificial noise, by which the ergodic secure transmission rate is maximized, by using the acquired lower bound of the ergodic secure transmission rate.

The acquiring of the lower bound of the ergodic transmission rate in the form of the closed solution may include acquiring a lower bound of the ergodic secure transmission rate that is attainable by using the artificial noise by acquiring a lower bound of the ergodic transmission rate that is attainable by the legal reception device and an upper bound of the ergodic transmission rate that is attainable by an eavesdropper.

In accordance with another aspect of the inventive concept, there is provided a secure communication method between a multi-antenna legal transmission device and a multi-antenna legal reception device including determining a power allocation ratio by reflecting a channel estimation error in a multi-antenna system including the multi-antenna legal transmission device and the multi-antenna legal reception device, generating a transmission signal including a secret information message based on the determined power allocation ratio, and transmitting the generated transmission signal to the legal reception device.

In accordance with another aspect of the inventive concept, there is provided a secure communication device between a multi-antenna legal transmission device and a multi-antenna legal reception device including a determination unit configured to determine a power allocation ratio for a system parameter, a generation unit configured to generate a transmission signal including a secret information message based on the determined power allocation ratio and artificial noise, and a transmission unit configured to transmit the generated transmission signal to the legal reception device.

In accordance with another aspect of the inventive concept, there is provided a secure communication device between a multi-antenna legal transmission device and a multi-antenna legal reception device including a determination unit configured to acquire a lower bound of an ergodic secure transmission rate that is attainable by using artificial noise in a form of a closed solution, and to determine an optimum power allocation ratio for a system parameter by using the acquired lower bound of the ergodic secure transmission rate, a generation unit configured to generate a transmission signal including a secret information message based on the determined optimum power allocation ratio and the artificial noise, and a transmission unit configured to transmit the generated transmission signal to the legal reception device.

In accordance with another aspect of the inventive concept, there is provided a secure communication device between a multi-antenna legal transmission device and a multi-antenna legal reception device including a determination unit configured to determine a power allocation ratio by reflecting a channel estimation error in a multi-antenna system including the multi-antenna legal transmission device and the multi-antenna legal reception device, a generation unit configured to generate a transmission signal including a secret information message based on the determined power allocation ratio, and a transmission unit configured to transmit the generated transmission signal to the legal reception device.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, exemplary embodiments of the inventive concept will be described in detail with reference to the accompanying drawings. However, the inventive concept is neither limited nor restricted by the embodiments. Further, the same reference numerals in the drawings denote the same members.

The inventive concept improves secure transmission rate by modeling a system while premising a multi-antenna system including a multi-antenna transmitter and a multi-antenna receiver, by calculating a power allocation ratio corresponding to the modeled system, and by transmitting a secret information message based on the calculated power allocation ratio.

Here, the power allocation ratio may be calculated in consideration of a system parameter such as a channel estimation error in a multi-antenna system.

If a legal transmitter is Alice (A), a legal receiver is Bob (B), an eavesdropper is Eve (E), and the numbers of antennas of users are $N_A$, $N_B$, and $N_E$, respectively, a main channel, that is, a channel between the legal transmitter and the legal receiver is a $N_B \times N_A$ matrix $H_b$, the elements of which follow a complex standard normal distribution, and an eavesdropping channel, that is, a channel between the legal transmitter and the eavesdropper is a $N_E \times N_A$ matrix $H_e$, the elements of which follow a complex standard normal distribution. It is assumed that the instantaneous value of the main channel $H_b$ is known to all the users, and it is assumed that the eavesdropper may know even the instantaneous value of the eavesdropping channel $H_e$ whereas the legal transmitter and the legal receiver may know only a distribution.

Then, if a transmission signal vector of a legal transmitter, the size of which is $N_A \times 1$ is s, the reception signal vectors $r_b$ and $r_e$ of a legal receiver and an eavesdropper may be expressed as in Equation 1.

$$r_b = H_b s + n_b, r_e = H_e s + n_e \qquad [\text{Equation 1}]$$

Here, $n_b$ and $n_e$ may mean thermal noise vectors of a legal receiver and an eavesdropper, the sizes of which are $N_B \times 1$ and $N_E \times 1$, and the elements of $n_b$ and $n_e$ may follow complex normal distributions in which a mean is 0, variances are $\sigma_b^2$ and $\sigma_e^2$.

In this environment, a legal transmitter who utilizes an artificial noise generating scheme transmits a secret information message vector x that is to be sent to the legal receiver and an artificial noise vector w that has been arbitrarily generated to deteriorate a reception signal of the eavesdropper together. If a total available transmission power is P and a ratio of power allocated to a secret information message to the total available transmission power is $\phi$, a transmission signal vector s of the legal transmitter is defined as in Equation 2.

$$s = \sqrt{\frac{\phi P}{N_B}} Fx + \sqrt{\frac{(1-\phi)P}{N_A - N_B}} Zw \qquad \text{[Equation 2]}$$

Here, matrix F may mean a pre-coding matrix, the size of which is $N_A \times N_B$, and matrix Z may mean a pre-coding matrix including perpendicular bases that generate a zero space of $H_b$, the size of which is $N_A \times (N_A - N_B)$. That is, an equation of $H_b Z = 0_{N_B \times (N_A - N_B)}$ is established so that the legal receiver is not influenced by artificial noise. Then, pre-coding matrixes F and Z may be obtained through a singular value decomposition of $H_b$. In detail, when an equation of $H_b = U \Lambda V^H$ is assumed, an equation of V=[F, Z] is established, and accordingly, Equation 1 may be represented as in Equation 2.

$$r_b = \sqrt{\frac{\phi P}{N_B}} H_b Fx + n_b \qquad \text{[Equation 3]}$$

$$r_e = \sqrt{\frac{\phi P}{N_B}} H_e Fx + \sqrt{\frac{(1-\phi)P}{N_A - N_B}} H_e Zw + n_e$$

As can be seen in Equation 3, it may be identified that the artificial noise w generated through an artificial noise generating scheme acts as interference to an eavesdropper while not influencing the legal receiver. It is well known that a secure transmission rate of more than 0 may be accomplished even though sequential channel information of the eavesdropper is not known when the artificial noise scheme is used (S. Goel and R. Negi, "Guaranteeing secrecy using artificial noise," IEEE Trans. Wireless Commun., vol. 7, no. 6, pp. 2180-2189, June 2008.).

In recent years, various studies for analyzing a secure transmission rate that may be acquired when the artificial noise scheme is utilized and discovering an optimum power allocation ratio through the secure transmission rate.

As an example, although a lower bound of an ergodic secure transmission rate in a multi-input single-output multi-antenna eavesdropper (MISOME) channel and an approximate lower bound of an ergodic secure transmission rate in a multi-input multi-output multi-antenna eavesdropper (MIMOME) channel are obtained in forms of solutions and optimum power allocation ratios by utilizing the bounds in conventional study 1 (X. Zhou and M. McKay, "Secure transmission with artificial noise over fading channels: Achievable rate and optimal power allocation," IEEE Trans. Veh. Technol., vol. 59, no. 8, pp. 3831-3842, October 2010) and conventional study 2 (S.-H. Tsai and H. V. Poor, "Power allocation for artificial-noise secure MIMO pre-coding systems," IEEE Trans. Signal Process., vol. 62, no. 13, pp. 3479-3493, July 2014), only an asymptotic area, that is, an area in which the number of antennas is enormously large and signal transmission power is enormously high is analyzed because of the mathematical complexity of the derived lower bounds. Further, because the study result of study 2 was derived by utilizing an approximate lower bound, accuracy cannot be secured in a zone in which the number of transmission antennas is small and signal transmission power is limited.

Although an accurate value of an ergodic secure transmission rate in an MIMOME channel is derived in the form of a closed solution in recent study 3 (S. Liu, Y. Hong, and E. Viterbo, "Artificial noise revisited," IEEE Trans. Inf. Theory, vol. 61, no. 7, pp. 3901-3911, July 2015), the closed solution includes complex functions that are hard to deal with so that it is difficult to analyze influences of various system parameters on the ergodic secure transmission rate.

The purpose of the embodiments of the inventive concept is to maximize an ergodic secure transmission rate by using an artificial noise scheme to perform secure communication in a multi-antenna wireless communication network in which an eavesdropper who is to eavesdrop a secret information message between legal users and based on a power allocation ratio of artificial noise and a secret information message.

Figure 1:
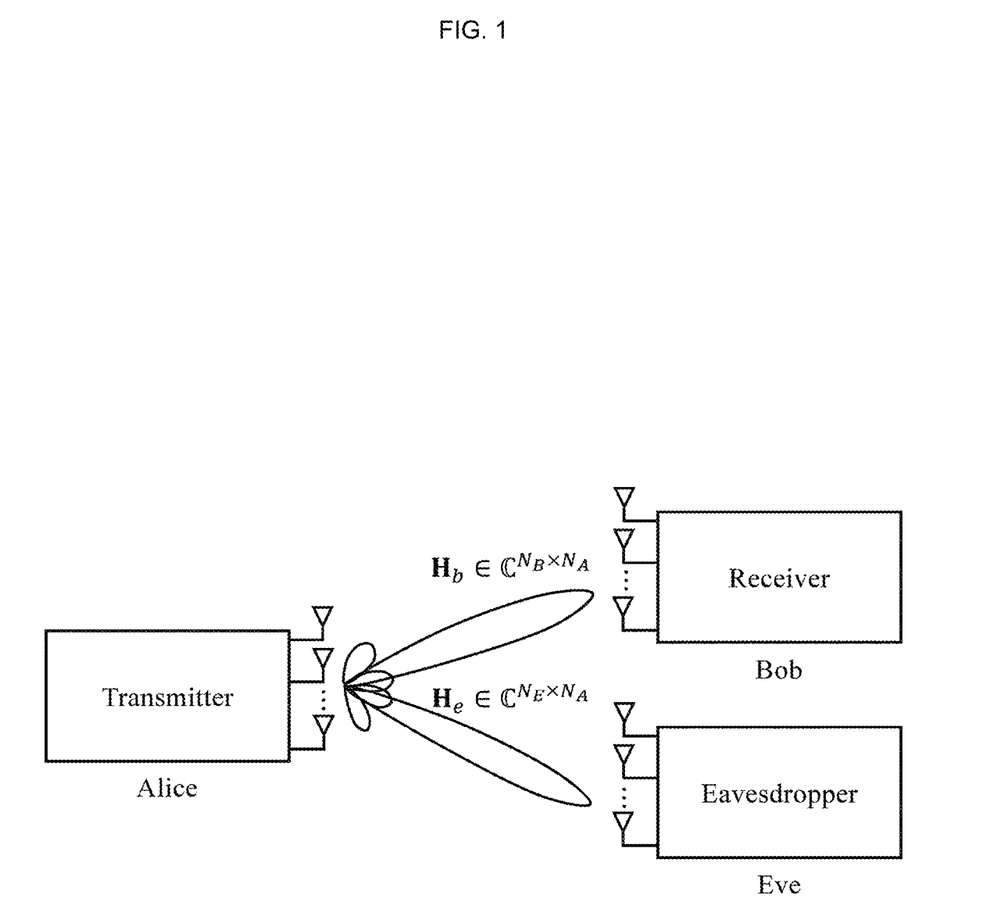
FIG. 1 illustrates a concept view of a multi-antenna transmission/reception network in which a multi-antenna eavesdropper is present.

FIG. 1 illustrates a concept view of a multi-antenna signal transmission/reception network in which a multi-antenna eavesdropper is present, and illustrates a concept view of an environment in which a legal transmitter, a legal receiver, and an eavesdropper are multi-antennas.

As illustrated in FIG. 1, if a legal transmitter is Alice (A), a legal receiver is Bob (B), an eavesdropper is Eve (E), and the numbers of antennas of users are $N_A$, $N_B$, and $N_E$, respectively, a channel between the legal transmitter and the legal receiver is a $N_B \times N_A$ matrix $H_b$, the elements of which follow a complex standard normal distribution, and an eavesdropping channel, that is, a channel between the legal transmitter and the eavesdropper is a $N_E \times N_A$ matrix $H_e$, the elements of which follow a complex standard normal distribution.

Figure 2:
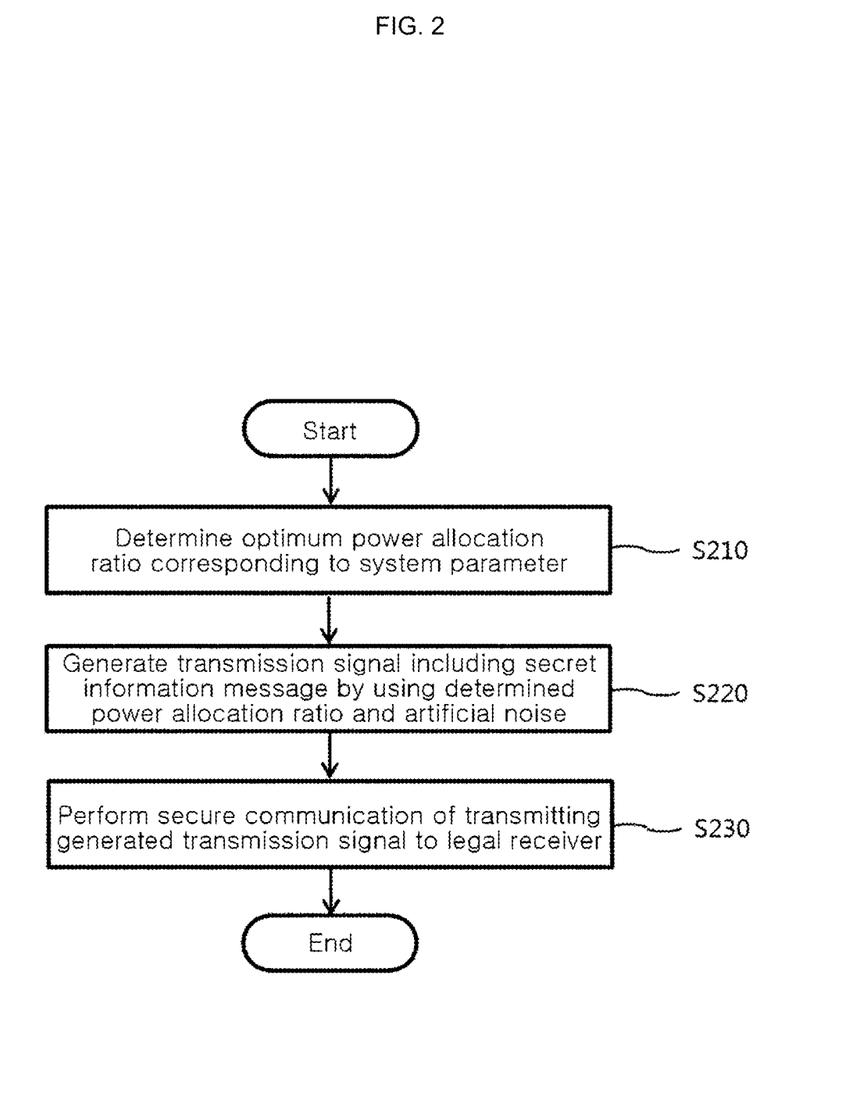
FIG. 2 illustrates an operational flowchart on a secure communication method according to an embodiment of the inventive concept.

FIG. 2 illustrates an operational flowchart on an artificial noise method according to an embodiment of the inventive concept.

Referring to FIG. 2, in the artificial noise method according to an embodiment of the inventive concept, an optimum power allocation ratio corresponding to current system parameters, such as the number of antennas, total available transmission power, and a channel estimation error coefficient (S210).

If the optimum power allocation ratio corresponding to the system parameters is determined in operation S210, a transmission signal is generated based on a secret information message and the optimum power allocation ratio as described in Equation 2 (S220).

If the transmission signal is generated in operation S220, a legal transmitter or a legal transmission device performs secure communication by transmitting the generated transmission signal to a legal receiver or a legal reception device (S230).

The secure communication method performed through the process will be described below in detail.

The contents that will be described below a method for discovering an optimum power allocation method corresponding to a system parameter in the inventive concept, and the optimum power allocation ratio means a power allocation ratio of artificial noise and a secret information message, which maximizes an ergodic secure transmission rate in the inventive concept. However, because it is difficult to derive an ergodic secure transmission rate in the form of a closed solution that may be mathematically analyzed, the inventive concept derives a lower bound of an ergodic secure transmission rate in the form of a closed solution that may be mathematically analyzed and discovers an optimum power allocation ratio that maximizes the lower bound of the ergodic secure transmission rate.

Generally, it is not easy for a legal transmitter and a legal receiver to acquire an instantaneous value of a main channel in a wireless communication environment. Accordingly, in order to consider a more general situation, the inventive concept assumes that the legal transmitter and the legal receiver estimate an instantaneous value of the main channel through a minimum mean squared error (MMSE) based channel estimating scheme.

According to the MMSE estimating scheme, an error of the channel estimation may be represented as in Equation 4.

$$H_b = \sqrt{1-\tau}\hat{H}_b + \sqrt{\tau}\tilde{H}_b \qquad \text{[Equation 4]}$$

Here, $\hat{H}_b$ and $\tilde{H}_b$ may mean an estimated main channel and a main channel estimation error, respectively, and $\tau$ may mean an estimation error coefficient having a value between 0 and 1.

$\hat{H}_b$ and $\tilde{H}_b$ are matrixes, elements of which follow a normal distribution, and $\hat{H}_b$ and $\tilde{H}_b$ are independent according to the MMSE estimating scheme. In the system in which the legal transmitter and the legal receiver may accurately know an instantaneous value of the main channel, $\tau$ becomes zero so that an estimation error does not occur.

The legal transmitter utilizes an artificial noise scheme for the estimated main channel, $\hat{H}_b$. That is, when an equation of $\hat{H}_b = U\Lambda V^H$ is assumed, an equation of V=[F, Z] is established, and because an error of estimation of a channel is present, an artificial noise component is leaked even to the legal receiver. In this case, the reception signal of the legal receiver represented in Equation 3 may be newly represented as in Equation 5.

$$r_b = H_b\left(\sqrt{\frac{\phi P}{N_B}}Fx + \sqrt{\frac{(1-\phi)P}{N_A - N_B}}Zw\right) + n_b \qquad \text{[Equation 5]}$$

$$= (\sqrt{1-\tau}\hat{H}_b + \sqrt{\tau}\tilde{H}_b)\left(\sqrt{\frac{\phi P}{N_B}}Fx + \sqrt{\frac{(1-\phi)P}{N_A - N_B}}Zw\right) + n_b$$

$$= \sqrt{\frac{(1-\tau)\phi P}{N_B}}\hat{H}_b Fx + \sqrt{\tau}\tilde{H}_b\left(\sqrt{\frac{\phi P}{N_B}}Fx + \sqrt{\frac{(1-\phi)P}{N_A - N_B}}Zw\right) + n_b$$

$$= \sqrt{\frac{(1-\tau)\phi P}{N_B}}G_0 x + \tilde{n}_b$$

Here, an equation of $G_0 = \hat{H}_b F$ is established and the final equality sign is $\tilde{n}_b \sim CN(0, \sigma_b^2 + \tau P)$ as a result of the assumption that a distribution of a sum of a leakage component and thermal noise follows Gaussian distribution, and it is assumed that the distribution is normalized with $\sigma_b^2 = 1$ in the inventive concept.

Gaussian distribution is assumed in Equation 5 because Gaussian distribution is a distribution that deteriorates the information reception rate of a legal receiver most among the distributions having the same power and is suitable for analyzing a lower bound of an attainable performance. Unlike this, because a reception signal of an eavesdropper is not influenced by an error of estimation of a channel, the reception signal of the eavesdropper may be represented as in Equation 6 when $G_1 = H_e F$, $G_2 = H_e Z$.

$$r_e = \sqrt{\frac{\phi P}{N_B}}G_1 x + \sqrt{\frac{(1-\phi)P}{N_A - N_B}}G_2 w + n_e \qquad \text{[Equation 6]}$$

Here, $G_1$ and $G_2$ are matrixes, elements of which follow a complex standard normal distribution, and may be independent from each other.

In the inventive concept, an ergodic secure transmission rate is used as a performance index that may be attainable in the above-described system model, and the ergodic secure transmission rate may be defined as in Equation 7.

$$R_s = E_{H_b, H_e}[I(x; r_b|\hat{H}_b) - I(x; r_e|H_b, H_e)]$$

$$= E_{G_0}[I(x; r_b|G_0)] - E_{G_1, G_2}[I(x; r_e|G_1, G_2)] \qquad \text{[Equation 7]}$$

That is, the ergodic secure transmission rate may be a difference between an attainable ergodic transmission rate of a legal receiver and an attainable ergodic transmission rate of an eavesdropper.

The inventive concept first discovers a lower bound of an attainable ergodic transmission rate of a legal receiver, discovers an upper bound of an attainable ergodic transmission rate of an eavesdropper, and obtains a lower bound of the finally attainable ergodic secure transmission rate in the form of a closed solution that may be mathematically analyzed. Further, a power allocation ratio of a secret information message that maximizes an attainable ergodic secure transmission rate and artificial noise is discovered later by utilizing the lower bound of the finally attainable ergodic secure transmission rate.

If the attainable ergodic transmission rate of the legal receiver, that is, the first term of the final equality sign of Equation 7 is $\overline{R}_b$, Equation 8 may be established according to the definition of the entropy of a polygonal complex normal distribution.

$$\overline{R}_b = E_{G_0}[I(x; r_b | G_0)] \qquad \text{[Equation 8]}$$

$$= E_{G_0}\left[\log_2\left|I_{N_B} + \frac{1-\tau}{1+\tau P}\frac{\phi P}{N_B}G_0 G_0^H\right|\right]$$

$$= E_{\hat{H}_b}\left[\log_2\left|I_{N_B} + \frac{1-\tau}{1+\tau P}\frac{\phi P}{N_B}\hat{H}_b \hat{H}_b^H\right|\right]$$

$$\geq N_B E_{\hat{H}_b}\left[\log_2\left(1 + \frac{1-\tau}{1+\tau P}\frac{\phi P}{N_B}|\hat{H}_b \hat{H}_b^H|^{\frac{1}{N_B}}\right)\right]$$

Here, the final inequality sign may be satisfied by a matrix equation theorem of Minkowski, and $\hat{H}_b \hat{H}_b^H$ may mean a Wishart matrix, the size of which is $N_B \times N_B$ and which follows a distribution of $W_{N_B}(N_A, I_{N_B})$.

The final inequality of Equation 8 may be represented as in Equation 9 by the convexity of a $\log(c+\exp(\cdot))$ function for an arbitrary positive real number c and Jensen inequality.

$$\overline{R}_b \geq N_B E_{\hat{H}_b}\left[\log_2\left(1 + \frac{1-\tau}{1+\tau P}\frac{\phi P}{N_B}|\hat{H}_b \hat{H}_b^H|^{\frac{1}{N_B}}\right)\right] \qquad \text{[Equation 9]}$$

$$\geq N_B \log_2\left(1 + \frac{1-\tau}{1+\tau P}\frac{\phi P}{N_B}\exp\right.$$

$$\left.\left(\frac{1}{N_B}\ln E_{\hat{H}_b}[|\hat{H}_b \hat{H}_b^H|]\right)\right)$$

-continued $$\geq N_B \log_2\left(1 + \frac{1-\tau}{1+\tau P}\frac{\phi P}{N_B}\Psi(N_A, N_B)\right)$$

Here, the final inequality sign may be acquired by applying the features of a random matrix and the property of a digamma function, and may mean $$\Psi(n_1, n_2) = \exp\left(\frac{1}{n_2}\sum_{i=1}^{n_2}\ln(n_i - i)\right).$$

Here, it is referred to as $\Psi(N_A, N_B) = \Psi_0$.

Next, if the attainable ergodic transmission rate of the eavesdropper, that is, the second term of the final equal sign of Equation 7 is $\bar{R}_e$, Equation 10 may be established according to the definitions of mutual information and the entropy of a polygonal complex normal distribution.

$$\bar{R}_e = E_{G_1, G_2}[I(x; r_e \mid G_1, G_2)] \qquad \text{[Equation 10]}$$
$$= E_{G_1, G_2}[h(r_e \mid G_1, G_2) - h(r_e \mid G_1, G_2, x)]$$
$$= E_{W_1, W_2}\left[\log_2\left|\sigma_e^2 I_{N_E} + \frac{\phi P}{N_B}W_1 + \frac{(1-\phi)P}{N_A - N_B}W_2\right|\right] -$$
$$E_{W_2}\left[\log_2\left|\sigma_e^2 I_{N_E} + \frac{(1-\phi)P}{N_A - N_B}W_2\right|\right]$$

Here, $W_1 = G_1 G_1^H$ and $W_2 = G_2 G_2^H$, and may mean Wishart matrixes that follow distributions of $W_{N_E}(N_B, I_{N_E})$ and $W_{N_E}(N_A - N_B, I_{N_E})$, respectively.

In order to obtain an upper bound of the attainable ergodic transmission rate $\bar{R}_e$ of the eavesdropper, an upper bound of the first term of the final equality sign of Equation 10 is obtained first and a lower bound of the second term of the final equality sign of Equation 10 is obtained.

First, the second term of the final equality sign of Equation 10 may be represented as in Equation 11 by utilizing, for example, the method for obtaining a lower bound of an attainable ergodic transmission rate of a legal transmitter.

$$E_{W_2}\left[\log_2\left|\sigma_e^2 I_{N_B} + \frac{(1-\phi)P}{N_A - N_B}W_2\right|\right] \geq \qquad \text{[Equation 11]}$$
$$N_E \log_2\left(\sigma_e^2 + \frac{(1-\phi)P}{N_A - N_B}\Psi(N_A - N_B, N_E)\right)$$

Here, it is referred to as $\Psi(N_A - N_B, N_E) = \Psi_1$.

Next, the first term of the final equality sign of Equation 10 may be represented as in Equation 12 by a concavity of a log-determinant function, Jensen inequality, and the features of a random matrix.

$$E_{W_1, W_2}\left[\log_2\left|\sigma_e^2 I_{N_E} + \frac{\phi P}{N_B}W_1 + \frac{(1-\phi)P}{N_A - N_B}W_2\right|\right] \leq \qquad \text{[Equation 12]}$$
$$E_{W_1}\left[\log_2\left|(\sigma_e^2 + (1-\phi)P)I_{N_E} + \frac{\phi P}{N_B}W_1\right|\right] =$$
$$N_E \log_2(\sigma_e^2 + (1-\phi)P) +$$
$$E_{W_1}\left[\log_2\left|I_{N_E} + \frac{\phi P}{N_B(\sigma_e^2 + (1-\phi)P)}W_1\right|\right]$$

Here, the final term of Equation 12 may be represented in the following two forms according to the sizes of $N_B$ and $N_E$.

First, the final term of Equation 12 may be represented as in Equation 13 by a concavity of a log-determinant function, Jensen inequality, and the features of a random matrix.

$$E_{W_1}\left[\log_2\left|I_{N_E} + \frac{\phi P}{N_B(\sigma_e^2 + (1-\phi)P)}W_1\right|\right] \leq \qquad \text{[Equation 13]}$$
$$N_E \log_2\left(1 + \frac{\phi P}{\sigma_e^2 + (1-\phi)P}\right)$$

Meanwhile, when an equation of $N_B < N_E$ is established, the final term of Equation 12 cannot be represented as in Equation 13. However, the final term of Equation 12 may be converted as in Equation 14 by a matrix determinant lemma.

$$E_{W_1}\left[\log_2\left|I_{N_E} + \frac{\phi P}{N_B(\sigma_e^2 + (1-\phi)P)}W_1\right|\right] = \qquad \text{[Equation 14]}$$
$$E_{\tilde{W}_1}\left[\log_2\left|I_{N_B} + \frac{\phi P}{N_B(\sigma_e^2 + (1-\phi)P)}\tilde{W}_1\right|\right] \leq$$
$$N_B \log_2\left(1 + \frac{\phi P}{\sigma_e^2 + (1-\phi)P}\frac{N_E}{N_B}\right)$$

Here, it may mean a Wishart matrix that follows $\tilde{W}_1 = G_1^H G_1$ and $W_{N_B}(N_E, I_{N_B})$.

Accordingly, it is satisfied by the concavity of the log-determinant function, Jensen inequality, and the features of the random matrix.

By using Equations 10 to 14, the attainable ergodic transmission rate of the eavesdropper may be represented as in Equation 15.

$$\bar{R}_e \leq \min[N_B, N_E]\log_2\left(1 + \frac{\phi P}{\sigma_e^2 + (1-\phi)P}\frac{\max[N_B, N_E]}{N_B}\right) + \qquad \text{[Equation 15]}$$
$$N_B\left[\log_2(\sigma_e^2 + (1-\phi)P) - \log_2\left(\sigma_e^2 + \frac{(1-\phi)P}{N_A - N_B}\Psi_1\right)\right]$$

Finally, the lower bound of the attainable ergodic secure transmission rate may be represented as in Equation 16 by inserting Equation 9 and Equation 15 into Equation 7.

$$\bar{R}_s \geq \Gamma(\phi) = N_B\left[\log_2\left(1 + \frac{\phi(1-\tau)P}{(1+\tau P)N_B}\Psi_0\right) - \qquad \text{[Equation 16]}$$
$$v_{min}\log_2\left(1 + v_{max}\frac{\phi P}{\sigma_e^2 + (1-\phi)P}\right)\right] -$$
$$N_E\left[\log_2(\sigma_e^2 + (1-\phi)P) - \log_2\left(\sigma_e^2 + \frac{(1-\phi)P}{N_A - N_B}\Psi_1\right)\right]$$

Here, it may mean $v_{min} = \min[1, N_E/N_B]$, $v_{min} = \max[1, N_E/N_B]$.

Figure 3:
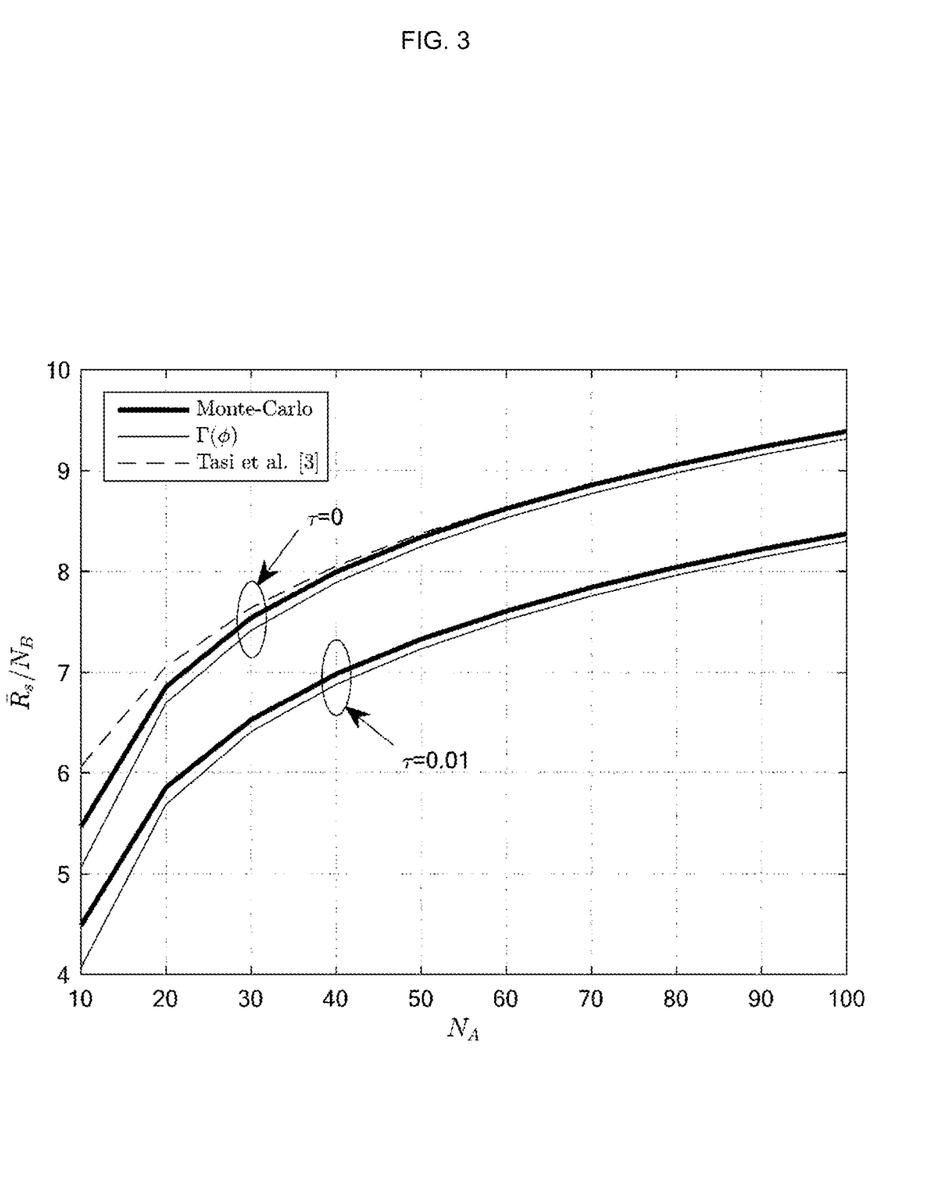
FIG. 3 illustrates an exemplary view of an actual ergodic secure transmission rate according to the number of transmission antennas, a lower bound of the inventive concept, and a lower bound suggested in conventional study 2.

FIG. 3 illustrates an exemplary view of an actual ergodic secure transmission rate according to the number of transmission antennas, a lower bound of the inventive concept, and a lower bound suggested in conventional study 2, and it is assumed that the number of antennas of the legal receiver is 5 and the number of antennas of the eavesdropper is 3 and it is assumed that a signal to noise ratio of the legal receiver and the eavesdropper is 20 dB and the power allocation parameter is 0.5.

As illustrated in FIG. 3, ergodic secure transmission rates for two cases in which estimation of a channel is perfect and a channel estimation error of 1% is present, and because a performance for a channel estimation error is not analyzed in conventional study 2 (S.-H. Tsai and H. V. Poor, "Power allocation for artificial-noise secure MIMO pre-coding systems," IEEE Trans. Signal Process., vol. 62, no. 13, pp. 3479-3493, July 2014), only a value experimentally measured when a channel estimation error of 1% is present and a lower bound suggested in the inventive concept are represented.

As can be seen through FIG. 3, there is a zone in which a lower bound of the ergodic secure transmission rate suggested by the inventive concept operates well as a lower bound of the experimentally measured ergodic secure transmission rate whereas the result of conventional study 2 (Tasi et al. [3]) shows the ergodic secure transmission rate suggested by the inventive concept is a value that is larger than the actual ergodic secure transmission rate when the number of transmission antennas is small.

Next, an optimum power allocation ratio is determined by utilizing a lower bound of the ergodic secure transmission rate suggested in Equation 16. As can be seen from Equation 16, the ergodic secure transmission rates may be of two different forms according to the number of antennas of the legal receiver and the eavesdropper. First, when an inequality of $N_B \geq N_E$ is established, the ergodic secure transmission rate may be represented as in Equation 17.

$$\bar{R}_s \geq \Gamma(\phi) = N_B \log_2\left(1 + \frac{1-\tau}{1+\tau P}\frac{\phi P}{N_B}\Psi_0\right) - \qquad \text{[Equation 17]}$$
$$N_E \log_2(\sigma_e^2 + P) + N_E \log_2\left(\sigma_e^2 + \frac{(1-\phi)P}{N_A - N_B}\Psi_1\right)$$

It may be identified that a second order derivative function of Equation 17 identified through a simple mathematical calculation always has a value that is smaller than 0 for a range of a possible power allocation parameter $\phi$.

That is, it can be seen that Equation 17 is a concave function for a power allocation parameter $\phi$, and accordingly, a maximum value may be easily discovered.

Meanwhile, when an inequality of $N_B < N_E$ is established, the ergodic secure transmission rate may be represented as in Equation 18.

$$\bar{R}_s \geq \Gamma(\phi) = N_B\left[\log_2\left(1 + \frac{1-\tau}{1+\tau P}\frac{\phi P}{N_B}\Psi_0\right) - \qquad \text{[Equation 18]}$$
$$\log_2\left(1 + \frac{\phi P}{\sigma_e^2 + (1-\phi)P}\frac{N_E}{N_B}\right)\right] -$$
$$N_E\left[\log_2(\sigma_e^2 + (1-\phi)P) - \log_2\left(\sigma_e^2 + \frac{(1-\phi)P}{N_A - N_B}\Psi_1\right)\right]$$

It can be identified through a simple mathematical calculation that Equation 18 is not concave due to the power allocation parameter. Because it is difficult to discover a maximum value of the function that is not concave through a mathematical analysis, the inventive concept suggests a lower bound of a new form that is very close to Equation 18 and is concave for a power allocation parameter to solve the problem.

First, because $\Psi_1 < N_A - N_B$ is established according to the definition of $\Psi(n_1, n_2)$, Equation 19 is satisfied.

$$\log_2\left(\sigma_e^2 + \frac{(1-\phi)P}{N_A - N_B}\Psi_1\right) \geq \qquad \text{[Equation 19]}$$
$$\log_2\left(\frac{\sigma_e^2}{N_A - N_B}\Psi_1 + \frac{(1-\phi)P}{N_A - N_B}\Psi_1\right) =$$
$$\log_2(\sigma_e^2 + (1-\phi)P) + \log_2\left(\frac{\Psi_1}{N_A - N_B}\right)$$

Accordingly, Equation 18 has a low bound of a new form as in Equation 20.

$$\bar{R}_s \geq \hat{\Gamma}(\phi) = N_B\left[\log_2\left(1 + \frac{1-\tau}{1+\tau P}\frac{\phi P}{N_B}\Psi_0\right) - \qquad \text{[Equation 20]}$$
$$\log_2\left(1 + \frac{\phi P}{\sigma_e^2 + (1-\phi)P}\frac{N_E}{N_B}\right)\right] + \sum_{i=1}^{N_B}\ln\left(1 - \frac{i}{N_A - N_B}\right)$$

Then, it can be identified through a simple mathematical calculation that Equation 11 is a function that is concave for a power allocation parameter $\phi$.

Figure 4:
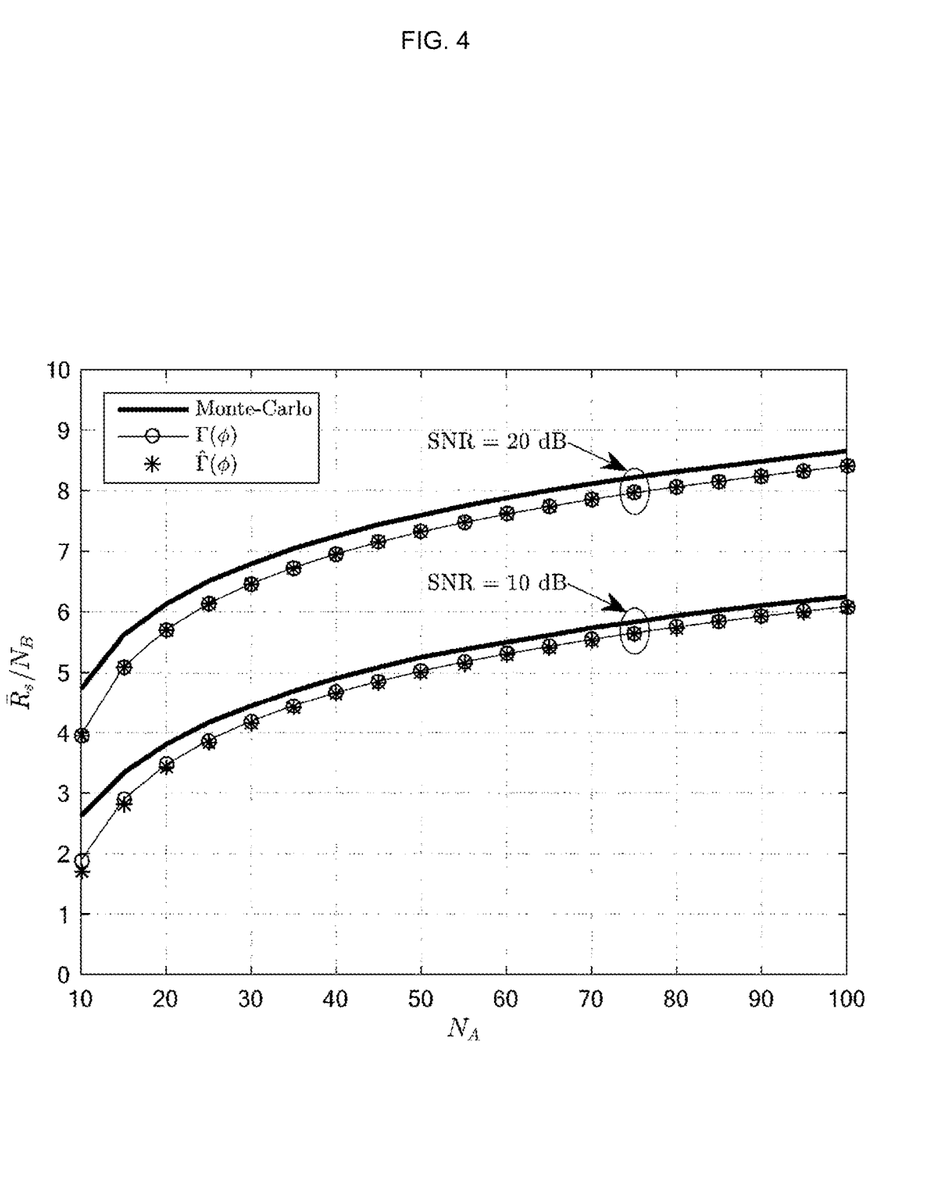
FIG. 4 illustrates an exemplary view of an actual ergodic secure transmission rate according to the number of transmission antennas, a lower bound represented in Equation 18, and a lower bound represented in Equation 20.

FIG. 4 illustrates an exemplary view of an actual ergodic secure transmission rate according to the number of transmission antennas, a lower bound illustrated in Equation 18, and a lower bound illustrated in Equation 20, and illustrates an exemplary view in which it is assumed that the number of antennas of a legal receiver is 3, the number of antennas of an eavesdropper is 4, a power allocation parameter is 0.5, and a channel estimation error is 1%.

As illustrated in FIG. 4, Equation 18 and Equation 20 have very similar values for two signal to noise ratios, and it can be identified that two lower bounds become closer as the signal to noise ratio increases and the number of transmission antennas increases.

Accordingly, hereinafter, the inventive concept calculates an optimum power allocation ratio by using $\Gamma(\phi)$ instead of $\hat{\Gamma}(\phi)$ when an inequality of $N_B < N_E$ is established.

As described above, a power allocation parameter that maximizes a lower bound of an ergodic secure transmission rate is a value of $\phi$ that maximizes Equation 17 or Equation 20 according to occasions, and it can be seen that Equation 17 and Equation 20 have maximum values at a border value or a unique point of $\phi$ (that is, $$\frac{d\Gamma(\phi)}{d\phi} = 0 \text{ or } \frac{d\hat{\Gamma}(\phi)}{d\phi} = 0)$$

because they are concave for the power allocation parameter $\phi$. However, because electric power cannot be allocated to a secret information message when $\phi$ is zero, the secure transmission rate becomes zero so that it is naturally excluded from an optimum power allocation ratio.

As a result, the power allocation parameter that maximizes the ergodic secure transmission rate is the unique points of Equation 17 and Equation 20, a problem of discovering an optimum power allocation ratio may be replaced by a problem of discovering a root of an equation that satisfies $$\frac{d\Gamma(\phi)}{d\phi} = 0 \text{ and } \frac{d\hat{\Gamma}(\phi)}{d\phi} = 0.$$

Meanwhile, when the unique points of Equation 17 and Equation 20 are larger than 1, ϕ may be 1 because the unique points are not included in the range of the power allocation ratio ϕ. That is, all the available transmission power is allocated to the secret information message.

The above-mentioned method for determining an optimum power allocation ratio may be as in Equation 21, and the optimum power allocation ratio may be determined by using Equation 21 in the inventive concept.

$$\phi^* = \begin{cases} \phi_1^*, & \text{for } \sigma_e^2 < \varepsilon_1 \text{ and } N_B \geq N_E \\ \phi_2^*, & \text{for } \sigma_e^2 < \varepsilon_2 \text{ and } N_B < N_E \\ 1, & \text{otherwise} \end{cases} \quad [\text{Equation 21}]$$

Here, it may mean $$\varepsilon_1 = \frac{N_E \Psi_1}{N_A - N_B}\left(\frac{P}{N_B} + \frac{1+\tau P}{(1-\tau)\Psi_0}\right),$$

$$\varepsilon_2 = \frac{1+\tau P}{1-\tau}\frac{N_E}{\Psi_0}\left(\frac{1}{2} + \sqrt{\frac{1}{4} + \frac{(1-\tau)\Psi_0 P}{N_E(1+\tau P)}\left(1 + \frac{(1-\tau)\Psi_0 P}{N_B(1+\tau P)}\right)}\right),$$

$$\phi_1^* = \frac{N_B}{N_B + N_E}\left(1 + \frac{\sigma_e^2}{P}\frac{N_A - N_B}{\Psi_1} - \frac{N_E(1+\tau P)}{(1-\tau)P\Psi_0}\right),$$

and $$\phi_2^* = \frac{\sigma_e^2 + P}{P}\frac{1}{N_B - N_E}\left(N_B - \sqrt{N_B N_E\left(1 + \frac{(N_B - N_E)(1+\tau P)}{(\sigma_e^2 + P)\Psi_0(1-\tau)}\right)}\right).$$

As can be seen in Equation 21, it can be seen that an optimum power allocation parameter is 1 when a dispersion of thermal noise of an eavesdropper is a specific size or more, that is, thermal noise of the eavesdropper is a dominant parameter that determines a signal to noise ratio of the eavesdropper. That is, it can be seen that it is helpful for maximizing an ergodic secure transmission rate to allocate electric power to a secret information message rather than to allocate electric power to artificial noise when a channel state of the eavesdropper is not good. Meanwhile, it can be seen that it is optimal to allocate electric power of $\phi_1^*$ or $\phi_2^*$ to the secret information message when the channel state of the eavesdropper is good by a specific threshold value $\varepsilon_1$ or $\varepsilon_2$ according to the sizes of $N_B$ and $N_E$.

Generally, the dispersion of the thermal noise of the eavesdropper is information which the legal transmitter is hard to know. In this case, it is assumed that the eavesdropper has an ideal channel state for secure communication. Accordingly, if an equation of $\sigma_e^2 = 0$ is assumed, the method for determining an optimum power allocation ratio may be abbreviated as in Equation 22.

$$\phi^* = \quad [\text{Equation 22}]$$

$$\begin{cases} \frac{N_B}{N_B + N_E}\left(1 - \frac{N_E(1+\tau P)}{(1-\tau)P\Psi_0}\right), & \text{for } N_B \geq N_E \\ \frac{1}{N_B - N_E}\left(N_B - \sqrt{N_B N_E\left(1 + \frac{(N_B - N_E)(1+\tau P)}{P\Psi_0(1-\tau)}\right)}\right), & \text{for } N_B < N_E \end{cases}$$

Further, when the transmission device utilizes a multi-antenna, that is, equations of $N_A \gg N_B$ and $N_A \gg N_E$ are established, Equation 22 may be simplified as in Equation 23.

$$\phi^* = \begin{cases} \frac{N_B}{N_B + N_E}, & \text{for } N_B \geq N_E \\ \frac{\sqrt{N_B}}{\sqrt{N_B} + \sqrt{N_E}}, & \text{for } N_B < N_E \end{cases} \quad [\text{Equation 23}]$$

Equation 23 is an optimum power allocation method when high transmission power without an influence of thermal noise and a large-scale multi-transmission antenna are used, and is an optimum power allocation method in the same asymptotic area as those analyzed in conventional studies 1 and 2. The result of conventional study 1 is $N_B < N_E$ and may be represented as the result of Equation 23 when $N_B$ is 1, and the result of conventional study 2 is $N_B \geq N_E$ and may be represented as the result of Equation 23. In other words, it can be seen that the optimum power allocation scheme suggested by the inventive concept includes the optimum power allocation schemes of conventional studies 1 and 2.

Figure 5:
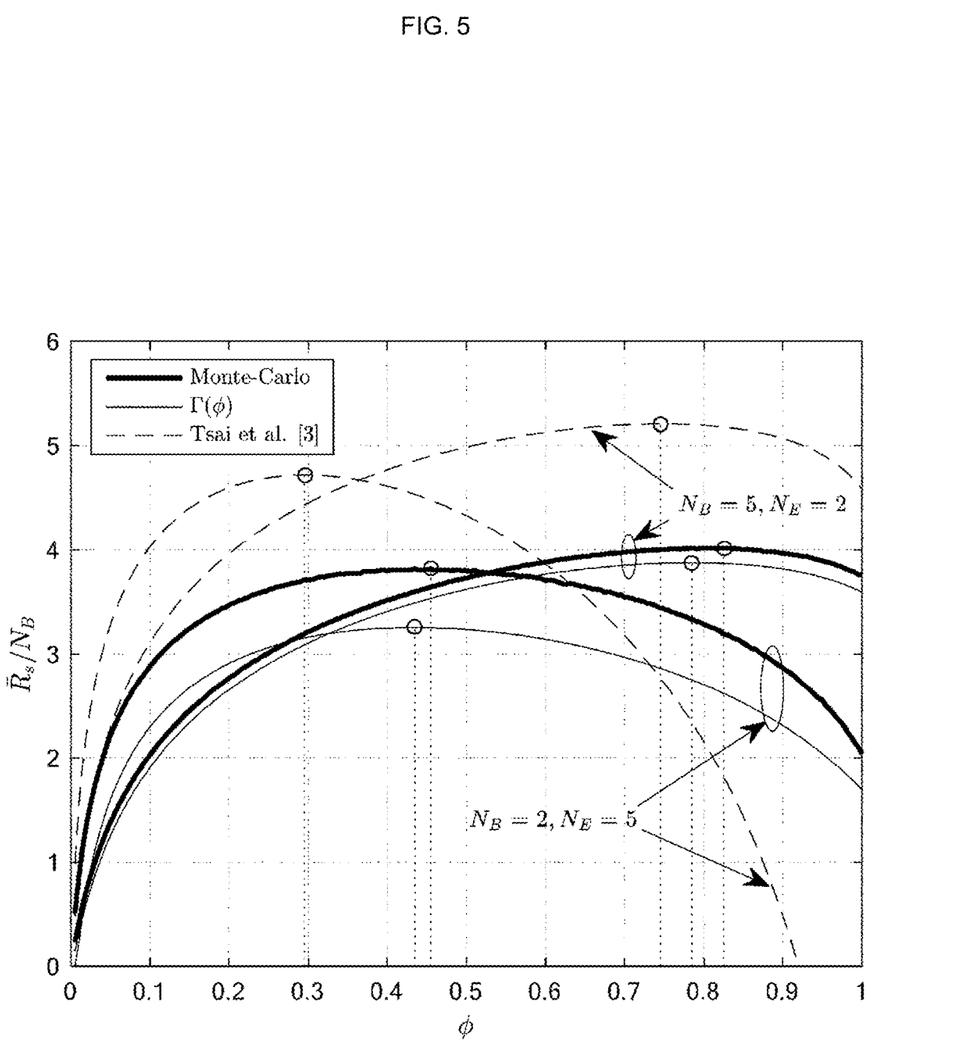
FIG. 5 illustrates an exemplary view of an actual ergodic secure transmission rate according to a power allocation parameter, and a lower bound of the inventive concept, and a lower bound suggested in conventional study 2.

FIG. 5 illustrates an exemplary view of an actual ergodic secure transmission rate according to a power allocation parameter, and a lower bound of the inventive concept, and a lower bound suggested in conventional study 2, and illustrates them for the numbers of antennas of the legal reception device and the eavesdropper.

As illustrated in FIG. 5, when power allocation parameters corresponding to the graphs are compared, it can be seen that the optimum power allocation parameter suggested in the inventive concept is closer to the experimentally measured optimum power allocation parameter as compared with the result of conventional study 2 (Tsai et al.[3]) regardless of the numbers of the antennas of the legal reception device and the antennas of the eavesdropper.

Figure 6:
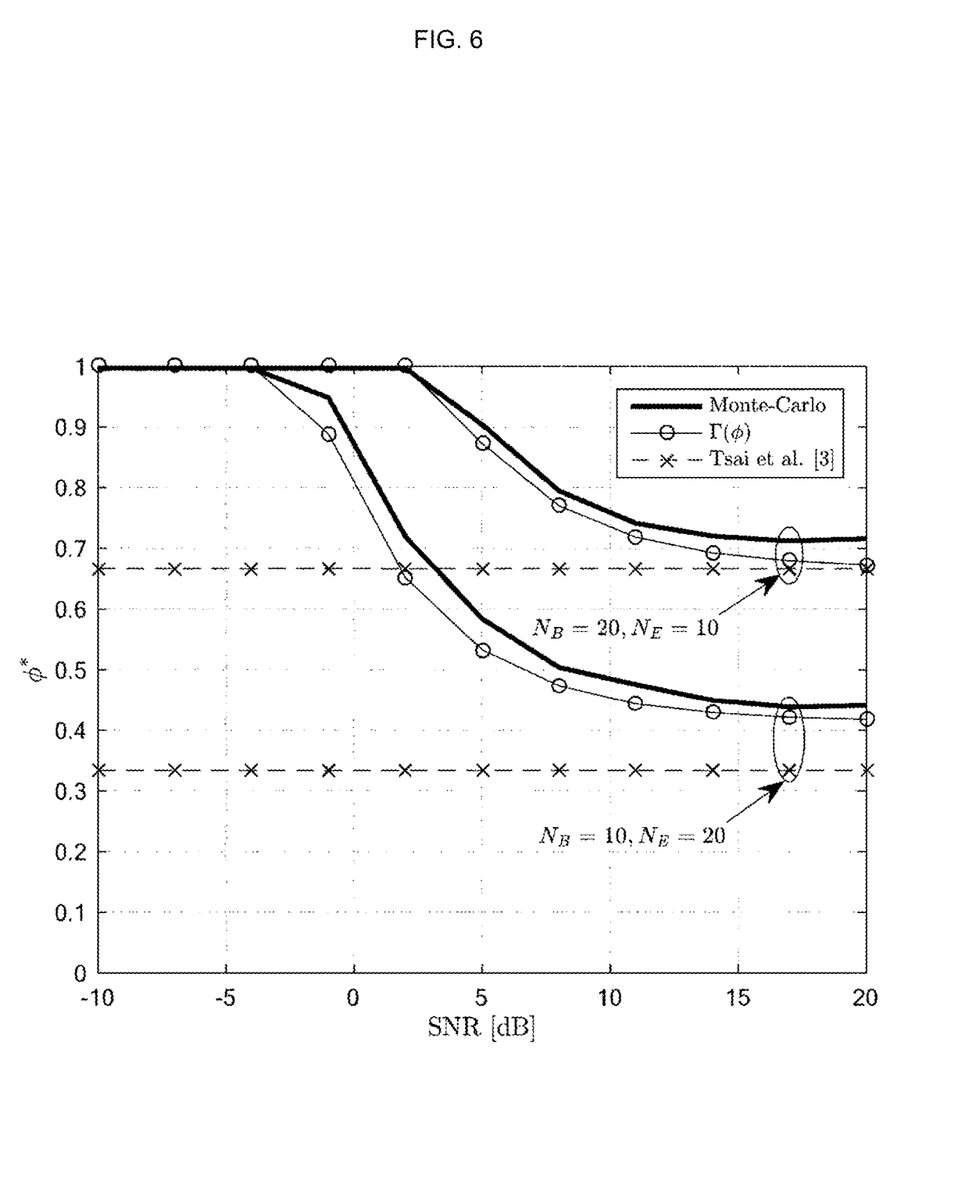
FIG. 6 is an exemplary view of an actual optimum power allocation parameter according to a reception signal to noise ratio, an optimum power allocation parameter suggested in the inventive concept, and an optimum power allocation parameter suggested in conventional study 2.

FIG. 6 is an exemplary view of an actual optimum power allocation parameter according to a reception signal to noise ratio, an optimum power allocation parameter suggested in the inventive concept, and an optimum power allocation parameter suggested in conventional study 2.

As illustrated in FIG. 6, it can be seen that an optimum power allocation parameter may be discovered only for an asymptotic area in which a signal to noise ratio is very large in conventional study 2 (Tsai et al.[3]) and an optimum power allocation parameter is well estimated in area of all signal to noise ratios when the method suggested by the inventive concept is used.

As can be seen through FIGS. 5 and 6, it can be seen that the power allocation parameter determined by using the lower bound of the ergodic secure transmission rate is closer than the actual optimum power allocation parameter than the power allocation parameter that may be acquired from an existing technology in the inventive concept. That is, the performance of secure communication that utilizes an artificial noise scheme may be remarkably improved by using the lower bound of the ergodic secure transmission rate suggested in the inventive concept and the power allocation parameter optimizing scheme utilizing the lower bound.

In this way, in the method according to the inventive concept, all of the legal transmission device, the legal reception device, and the eavesdropper may transmit an artificial noise signal together with a secret information message in a multi-antenna environment to improve a secure transmission rate, and may maximize an ergodic secure transmission rate based on the system parameter, in particular, a power allocation ratio of the secret information message and the artificial noise.

An ergodic secure transmission rate may be maximized by using the optimum power allocation scheme of discovering an optimum power allocation ratio in a given system parameter, by obtaining a lower bound of an ergodic secure transmission rate that may be acquired when an artificial noise generating technology in a secure communication problem between legal users in the form of a closed solution that may be mathematically analyzed and by analyzing a system parameter, in particular, an influence of a power allocation ratio between a secret information message and artificial noise on the ergodic secure transmission rate.

Further, in the method according to the inventive concept, an optimum power allocation ratio may be easily calculated without using complex repeated calculations, and because no restrictions are applied to an allowable range of the system parameter, an ergodic secure transmission rate may be maximized in all areas by overcoming the limits of the existing inventions that informs only an optimum power allocation ratio in an asymptotic area.

Further, in the method according to the inventive concept, a system may be modeled by premising a multi-antenna system including a multi-antenna transmission device and a multi-antenna reception device and a power allocation ratio corresponding to the modeled system may be calculated, and in detail, an ergodic secure transmission rate may be maximized based on a calculated power allocation ratio by modeling a multi-antenna system with a model having a channel estimation error and calculating a power allocation ratio in consideration of a channel estimation error in the modeled system. In this way, in the method according to the inventive concept, a power allocation ratio may be calculated in consideration of a channel estimation error in a multi-antenna system and a secure transmission rate may be maximized based on the calculated power allocation ratio.

Figure 7:
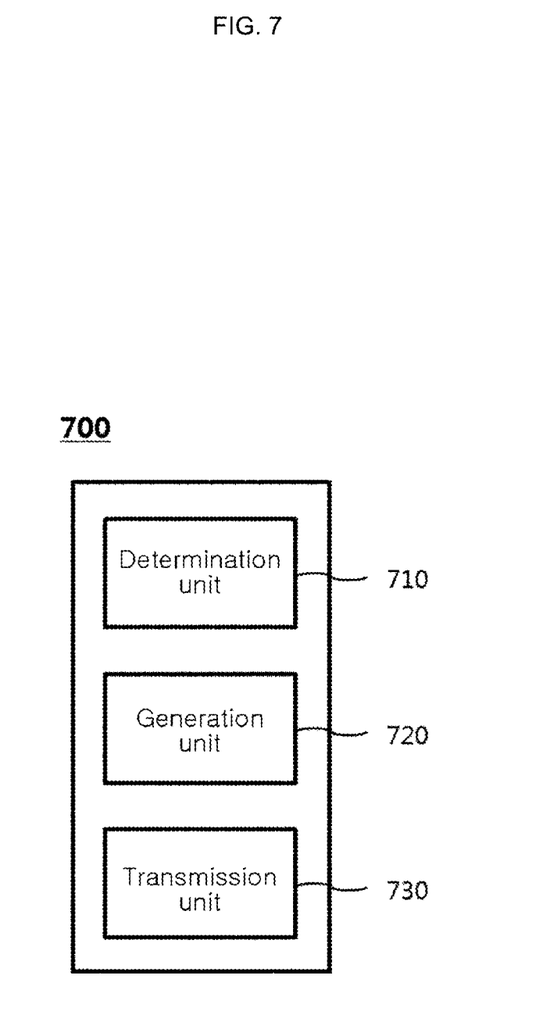
FIG. 7 illustrates a configuration of a secure communication apparatus according to an embodiment of the inventive concept.

FIG. 7 illustrates a configuration of a secure communication device according to an embodiment of the inventive concept, and illustrates a configuration of a device that performs the secure communication methods of FIGS. 1 to 6.

Referring to FIG. 7, the secure communication device 700 according to the embodiment of the inventive concept includes a determination unit 710, a generation unit 720, and a transmission unit 730.

The determination unit 710 determines a power allocation ratio for a system parameter.

Here, the determination unit 710 may determine an optimum power allocation ratio corresponding to system parameters including the number of antennas, total available transmission power, and a channel estimation error coefficient, in particular, a maximum power allocation ratio of a secret information message and artificial noise.

Then, the determination unit 710 may acquire a lower bound of an ergodic secure transmission rate that may be acquired by using artificial noise in the form of a closed solution and may determine an optimum power allocation ratio for a system parameter by using the acquired ergodic secure transmission rate, and in particular, may determine an optimum power allocation ratio of a secret information message and artificial noise, which maximizes the ergodic secure transmission rate.

In detail, the determination unit 710 may acquire a lower bound of an ergodic secure transmission rate that may be acquired by using artificial noise in the form of a closed solution by acquiring a lower bound of an ergodic transmission rate that may be acquired by a legal reception device and an upper bound of an ergodic transmission rate that may be acquired by an eavesdropper, and may determine an optimum power allocation ratio by which the acquired ergodic secure transmission rate is maximized.

The generation unit 720 generates a transmission signal including a secret information message based on the power allocation ratio determined by the determination unit 710 and artificial noise.

That is, the transmission signal generated by the generation unit 720 may maximize an ergodic secure transmission rate for an eavesdropper because electric power is allocated by an optimum power allocation ratio of a secret information message and artificial noise and a transmission signal including a secret information message is generated by using the allocated optimum power allocation ratio and an artificial noise scheme.

The transmission unit 730 transmits the transmission signal generated by the generation unit 720 to a legal reception device by using a multi-antenna.

Although not illustrated in FIG. 7, the device of FIG. 7 may include all the operations for the secure communication method described with reference to FIGS. 1 to 6.

The above-described system or apparatus may be realized by a hardware element, a software element, and/or a combination of a hardware element and a software element. For example, the system, the apparatus and the elements described in the embodiments, for example, may be realized by using one or more general-purpose computer or a specific-purpose computer such as a processor, a controller, an arithmetic logic unit (ALU), a digital signal processor, a microcomputer, a field programmable array (FPA), a programmable logic unit (PLU), a microprocessor, or any device that may execute and respond to an instruction. The processing device may perform an operation system and one or more software applications performed on the operating system. Further, the processing device may access, data, manipulate, process, and produce data in response to execution of software. Although one processing device is used for convenience of understanding, it may be easily understood by those skilled in the art that the processing device may include a plurality of processing elements and/or a plurality of types of processing elements. For example, the processing device may include a plurality of processors or one processor and one controller. Further, another processing configuration, such as a parallel processor, may be possible.

The software may include a computer program, a code, an instruction, or a combination of one or more thereof, and the processing device may be configured to be operated as desired or commands may be made to the processing device independently or collectively. The software and/or data may be permanently or temporarily embodied in any type of machine, a component, a physical device, virtual equipment, a computer storage medium or device, or a signal wave transmitted in order to be interpreted by the processing device or to provide an instruction or data to the processing device. The software may be dispersed on a computer system connected to a network, to be stored or executed in a dispersive method. The software and data may be stored in one or more computer readable recording media.

The method according to the embodiment may be implemented in the form of a program instruction that may be performed through various computer means, and may be recorded in a computer readable medium. The computer readable medium may include a program instruction, a data file, and a data structure alone or in combination thereof. The program instruction recorded in the medium may be designed or configured particularly for the embodiment or may be a usable one known to those skilled in computer software. An example of the computer readable recording medium may include magnetic media such as a hard disk, a floppy disk, and a magnetic tape, optical recording media such as a CD-ROM and a DVD, magneto-optical media such as a floptical disk, and hardware devices that are particularly configured to store and perform a program instruction, such as a ROM, a RAM, and a flash memory. Further, an example of the program instruction may include high-level language codes which may be executed by a computer using an interpreter as well as machine languages created by using a compiler. The above-mentioned hardware device may be configured to be operated as one or more software module to perform operations of various embodiments, and the converse is applied.

In this way, according to the embodiments of the inventive concept, all of the legal transmission device, the legal reception device, and the eavesdropper may transmit an artificial noise signal together with a secret information message in a multi-antenna environment to improve a secure transmission rate, and may maximize an ergodic secure transmission rate based on the system parameter, in particular, a power allocation ratio of the secret information message and the artificial noise.

According to the embodiments of the inventive concept, an ergodic secure transmission rate may be maximized by using the optimum power allocation scheme of discovering an optimum power allocation ratio in a given system parameter, by obtaining a lower bound of an ergodic secure transmission rate that may be acquired when an artificial noise generating technology in a secure communication problem between legal users in the form of a closed solution that may be mathematically analyzed and by analyzing a system parameter, in particular, an influence of a power allocation ratio between a secret information message and artificial noise on the ergodic secure transmission rate.

According to the embodiments of the inventive concept, an optimum power allocation ratio may be easily calculated without using complex repeated calculations, and because no restrictions are applied to an allowable range of the system parameter, an ergodic secure transmission rate may be maximized in all areas by overcoming the limits of the existing inventions that informs only an optimum power allocation ratio in an asymptotic area.

Although the embodiments of the present disclosure have been described with reference to the limited embodiments and the drawings, the inventive concept may be variously corrected and modified from the above description by those skilled in the art to which the inventive concept pertains. For example, the above-described technologies can achieve a suitable result even though they are performed in different sequences from those of the above-mentioned method and/or coupled or combined in different forms from the method in which the constituent elements such as the system, the architecture, the device, or the circuit are described, or replaced or substituted by other constituent elements or equivalents.

Therefore, the other implementations, other embodiments, and the equivalents of the claims pertain to the scope of the claims.

What is claimed is:

1. A secure communication method between a multi-antenna legal transmission device and a multi-antenna legal reception device comprising:

determining a power allocation ratio for a system parameter, by the legal reception device;
generating a transmission signal including a secret information message based on the determined power allocation ratio and artificial noise; and
transmitting the generated transmission signal to the legal reception device;
wherein the determining of the power allocation ratio includes:
acquiring a lower bound of an ergodic secure transmission rate acquired by using the artificial noise in a form of a closed solution, and determining an optimum power allocation ratio ($\phi^*$) for the system parameter by using the acquired lower bound of the ergodic secure transmission rate based on the equation:

$$\phi^* = \begin{cases} \dfrac{N_B}{N_B + N_E}\left(1 - \dfrac{N_E(1 + \tau P)}{(1-\tau)P\Psi_0}\right), & \text{for } N_B \geq N_E \\ \dfrac{1}{N_B - N_E}\left(N_B - \sqrt{N_B N_E\left(1 + \dfrac{(N_B - N_E)(1+\tau P)}{P\Psi_0(1-\tau)}\right)}\right), & \text{for } N_B < N_E \end{cases},$$

in which,
$N_E$ is a number of eavesdropper antennas,
$N_B$ is a number of legal reception device antennas,
$\tau$ is a channel estimation error coefficient;
P is total available transmission power, and
$\Psi_0$ is the final inequality sign.

2. The secure communication method of claim 1, wherein the determining of the power allocation ratio includes:
determining an optimum power allocation ratio of the secret information message and the artificial noise, by which the ergodic secure transmission rate is maximized, by using the acquired lower bound of the ergodic secure transmission rate.

3. The secure communication method of claim 1, wherein the determining of the power allocation ratio includes:
acquiring a lower bound of the ergodic secure transmission rate that is attainable by using the artificial noise by acquiring a lower bound of the ergodic transmission rate that is attainable by the legal reception device and an upper bound of the ergodic transmission rate that is attainable by an eavesdropper.

4. A secure communication method between a multi-antenna legal transmission device and a multi-antenna legal reception device comprising:
acquiring a lower bound of an ergodic secure transmission rate that is attainable by using artificial noise in a form of a closed solution;
determining an optimum power allocation ratio ($\phi^*$) for a system parameter by using the acquired lower bound of the ergodic secure transmission rate, by the legal transmission device, based on the equation:

$$\phi^* = \begin{cases} \dfrac{N_B}{N_B + N_E}\left(1 - \dfrac{N_E(1 + \tau P)}{(1-\tau)P\Psi_0}\right), & \text{for } N_B \geq N_E \\ \dfrac{1}{N_B - N_E}\left(N_B - \sqrt{N_B N_E\left(1 + \dfrac{(N_B - N_E)(1+\tau P)}{P\Psi_0(1-\tau)}\right)}\right), & \text{for } N_B < N_E \end{cases},$$

in which,
$N_E$ is a number of eavesdropper antennas,
$N_B$ is a number of legal reception device antennas, τ is a channel estimation error coefficient;
P is total available transmission power, and
$\Psi_0$ is the final inequality sign;
generating a transmission signal including a secret information message based on the determined optimum power allocation ratio and the artificial noise; and
transmitting the generated transmission signal to the legal reception device.

5. The secure communication method of claim 4, wherein the determining of the power allocation ratio includes:
determining an optimum power allocation ratio of the secret information message and the artificial noise, by which the ergodic secure transmission rate is maximized, by using the acquired lower bound of the ergodic secure transmission rate.

6. The secure communication method of claim 4, wherein the acquiring of the lower bound of the ergodic transmission rate in the form of the closed solution includes:
acquiring a lower bound of the ergodic secure transmission rate that is attainable by using the artificial noise by acquiring a lower bound of the ergodic transmission rate that is attainable by the legal reception device and an upper bound of the ergodic transmission rate that is attainable by an eavesdropper.

7. A secure communication method between a multi-antenna legal transmission device and a multi-antenna legal reception device comprising:
determining a power allocation ratio by reflecting a channel estimation error in a multi-antenna system including the multi-antenna legal transmission device and the multi-antenna legal reception device, wherein the determining of the power allocation ratio includes acquiring a lower bound of an ergodic secure transmission rate that is attainable by using artificial noise in a form of a closed solution, and determining an optimum power allocation ratio ($\phi^*$) for the channel estimation error using the acquired lower bound of the ergodic secure transmission rate and based on the equation:

$$\phi^* = \begin{cases} \frac{N_B}{N_B + N_E}\left(1 - \frac{N_E(1+\tau P)}{(1-\tau)P\Psi_0}\right), \text{ for } N_B \geq N_E \\ \frac{1}{N_B - N_E}\left(N_B - \sqrt{N_B N_E\left(1 + \frac{(N_B - N_E)(1+\tau P)}{P\Psi_0(1-\tau)}\right)}\right), \text{ for } N_B < N_E \end{cases},$$

in which,
$N_E$ is a number of eavesdropper antennas in the multi-antenna system,
$N_B$ is a number of legal reception device antennas,
τ is a channel estimation error coefficient;
P is total available transmission power, and
$\Psi_0$ is the final inequality sign;
generating a transmission signal including a secret information message based on the determined power allocation ratio; and
transmitting the generated transmission signal to the legal reception device.

8. A secure communication device between a multi-antenna legal transmission device and a multi-antenna legal reception device comprising:
a determination unit configured to determine a power allocation ratio for a system parameter by acquiring a lower bound of an ergodic secure transmission rate using artificial noise in a form of a closed solution, and determining an optimum power allocation ratio ($\phi^*$) for the system parameter using the acquired lower bound of the ergodic secure transmission rate and based on the equation:

$$\phi^* = \begin{cases} \frac{N_B}{N_B + N_E}\left(1 - \frac{N_E(1+\tau P)}{(1-\tau)P\Psi_0}\right), \text{ for } N_B \geq N_E \\ \frac{1}{N_B - N_E}\left(N_B - \sqrt{N_B N_E\left(1 + \frac{(N_B - N_E)(1+\tau P)}{P\Psi_0(1-\tau)}\right)}\right), \text{ for } N_B < N_E \end{cases},$$

in which,
$N_E$ is a number of eavesdropper antennas,
$N_B$ is a number of legal reception device antennas,
τ is a channel estimation error coefficient;
P is total available transmission power, and
$\Psi_0$ is the final inequality sign;
a generation unit configured to generate a transmission signal including a secret information message based on the determined power allocation ratio and the artificial noise; and
a transmission unit configured to transmit the generated transmission signal to the legal reception device.

9. The secure communication device of claim 8, wherein the determination unit determines an optimum power allocation ratio of the secret information message and the artificial noise, by which the ergodic secure transmission rate is maximized, by using the acquired lower bound of the ergodic secure transmission rate.

10. The secure communication device of claim 8, wherein the determination unit acquires a lower bound of the ergodic secure transmission rate that is attainable by using the artificial noise by acquiring a lower bound of the ergodic transmission rate that is attainable by the legal reception device and an upper bound of the ergodic transmission rate that is attainable by an eavesdropper.

11. A secure communication device between a multi-antenna legal transmission device and a multi-antenna legal reception device comprising:
a determination unit configured to acquire a lower bound of an ergodic secure transmission rate that is attainable by using artificial noise in a form of a closed solution, and to determine an optimum power allocation ratio for a system parameter by using the acquired lower bound of the ergodic secure transmission rate based on the equation:

$$\phi^* = \begin{cases} \frac{N_B}{N_B + N_E}\left(1 - \frac{N_E(1+\tau P)}{(1-\tau)P\Psi_0}\right), \text{ for } N_B \geq N_E \\ \frac{1}{N_B - N_E}\left(N_B - \sqrt{N_B N_E\left(1 + \frac{(N_B - N_E)(1+\tau P)}{P\Psi_0(1-\tau)}\right)}\right), \text{ for } N_B < N_E \end{cases},$$

in which,
$N_E$ is a number of eavesdropper antennas,
$N_B$ is a number of legal reception device antennas,
τ is a channel estimation error coefficient;
P is total available transmission power, and
$\Psi_0$ is the final inequality sign;
a generation unit configured to generate a transmission signal including a secret information message based on the determined optimum power allocation ratio and the artificial noise; and
a transmission unit configured to transmit the generated transmission signal to the legal reception device.

12. The secure communication device of claim 11, wherein the determination unit determines an optimum power allocation ratio of the secret information message and the artificial noise, by which the ergodic secure transmission rate is maximized, by using the acquired lower bound of the ergodic secure transmission rate.

13. The secure communication device of claim 11, wherein the determination unit acquires a lower bound of the ergodic secure transmission rate that is attainable by using the artificial noise by acquiring a lower bound of the ergodic transmission rate that is attainable by the legal reception device and an upper bound of the ergodic transmission rate that is attainable by an eavesdropper.

14. A secure communication device between a multi-antenna legal transmission device and a multi-antenna legal reception device comprising:
- a determination unit configured to determine a power allocation ratio by reflecting a channel estimation error in a multi-antenna system including the multi-antenna legal transmission device and the multi-antenna legal reception device, the determination unit being further configured to acquire a lower bound of an ergodic secure transmission rate that is attainable by using artificial noise in a form of a closed solution, and to determine an optimum power allocation ratio ($\phi^*$) for the channel estimation error using the acquired lower bound of the ergodic secure transmission rate and based on the equation:

$$\phi^* = \begin{cases} \dfrac{N_B}{N_B + N_E}\left(1 - \dfrac{N_E(1+\tau P)}{(1-\tau)P\Psi_0}\right), & \text{for } N_B \geq N_E \\ \dfrac{1}{N_B - N_E}\left(N_B - \sqrt{N_B N_E\left(1 + \dfrac{(N_B - N_E)(1+\tau P)}{P\Psi_0(1-\tau)}\right)}\right), & \text{for } N_B < N_E \end{cases},$$

in which,
- $N_E$ is a number of evesdropper antennas in the multi-antenna system,
- $N_B$ is a number of legal reception device antennas,
- $\tau$ is a channel estimation error coefficient;
- P is total available transmission power, and
- $\Psi_0$ is the final inequality sign;

a generation unit configured to generate a transmission signal including a secret information message based on the determined power allocation ratio; and a transmission unit configured to transmit the generated transmission signal to the legal reception device.

15. The secure communication method of claim 1, wherein the system parameter is a channel estimation error.

16. The secure communication device of claim 8, wherein the system parameter is a channel estimation error.

* * * * *